United States Patent [19] [11] 4,196,473
Chea [45] Apr. 1, 1980

[54] REMOTE POSITION PLOTTER

[75] Inventor: Francisco Chea, Orlando, Fla.

[73] Assignee: The United States of America as represented by the Secretary of the Navy, Washington, D.C.

[21] Appl. No.: 943,600

[22] Filed: Sep. 18, 1978

[51] Int. Cl.[2] ........................ G06G 7/22; G01C 21/20

[52] U.S. Cl. .................................. 364/449; 33/23 R; 318/580; 340/24

[58] Field of Search ........................ 364/449; 33/23 R; 340/27 NA, 24; 73/178 R, 178 T; 343/50 P, 112 R, 112 C, 112 PT; 318/580

[56] References Cited

U.S. PATENT DOCUMENTS

| | | | |
|---|---|---|---|
| 2,569,328 | 9/1951 | Omberg | 364/449 |
| 3,515,342 | 6/1970 | Brunk | 364/449 |
| 3,832,781 | 9/1974 | Flagge | 33/23 R |
| 3,869,601 | 3/1975 | Metcalf | 364/449 |
| 3,886,887 | 6/1975 | Cunningham et al. | 364/449 |
| 3,924,107 | 12/1975 | Sakai | 364/449 |

*Primary Examiner*—Errol A. Krass
*Attorney, Agent, or Firm*—Richard S. Sciascia; Robert W. Adams; David S. Kalmbaugh

[57] ABSTRACT

An instrument for determining and measuring the "X" and "Y" coordinate distances a moving vehicle is located from a predetermined reference point at any given instant is disclosed as incorporating a tensioned range measuring wire, an angle sighting arm through which said tensioned range wire operates, range and angle potentiometers effectively connected to said tensioned range wire and angle sighting arm for constantly producing a pair of analog signals that are proportional to range and angular distances to said moving vehicle, respectively. A computer automatically computes the instantaneous "X" and "Y" coordinates of said vehicle with respect to the aforesaid predetermined known reference point from said pair of analog signals. An important and unique brake sub-combination permits the instrument and vehicle whose coordinates are being measured to be held in combined static equilibrium when they are not in use.

23 Claims, 4 Drawing Figures

REMOTE POSITION PLOTTER

FIELD OF THE INVENTION

The present invention, in general, pertains to measuring instruments and, in particular, is an instrument for plotting the position of any predetermined object with respect to a known reference position. In even greater particularity, the subject invention is an improved device for determining and indicating the "X" and "Y" coordinate distances of a moving vehicle from a given reference point at any given instant, even though said moving vehicle may be remotely located from the aforesaid reference point.

DESCRIPTION OF THE PRIOR ART

Insofar as it is known, the best prior art appears to be the Measuring Probe Position Recorder invented by Bruce Flagge of Yorktown, Virginia, and patented thereby in U.S. Pat. No. 3,832,781, issued on Sept. 3, 1974. According to said patent, the aforesaid Measuring Probe Position Recorder is a device which enables a person to record the locations of measurements made by a hand-held noncontacting probe. The hand probe is coupled to a linear potentiometer and a sine-cosine potentiometer by means that varies the output of the linear potentiometer in proportion to the distance between the hand probe and the linear potentiometer and, also, that varies the output of the sine-cosine potentiometer in proportion to the angular movement of the hand probe relative to the sine-cosine potentiometer. The output of the linear potentiometer is applied directly to one input of the sine-cosine potentiometer, and, in addition, it is applied through an inverter to the other input of the sine-cosine potentiometer. The cosine and sine outputs of the sine-cosine potentiometer are then respectively supplied to the X and Y inputs of an X-Y recorder. Hence, as the hand probe moves over a model, the stylus of the X-Y recorder makes corresponding moves on a chart or the like; and, consequently, the person using the hand probe can move it along the outline of a particular model, thereby causing a similar outline to be reproduced on the X-Y recorder. Structural measurements are, thus, made which may be marked by the recorder stylus, if desired. Accordingly, a sketch of a model may be made, and markings indicating certain measurements of interest marked thereon at the same time.

SUMMARY OF THE INVENTION

For its intended purpose of drawing model shapes, the above described invention of Flagge undoubtedly works quite well; however, it also appears to leave something to be desired from the standpoints of utility, fail-safe operation, and perhaps accuracy of measurements, the latter of which will be discussed more fully subsequently. Therefore, suffice to say at this time, that the instant invention appears to be an improvement over the aforementioned prior art, in that it provides accurate X and Y coordinate indications (and analog signals respectively corresponding thereto) which may be used to define the position of a moving vehicle remotely disposed from a known reference point, or to effect the operation of other suitable compatible utilization apparatus in accordance therewith.

Therefore, one of the paramount objects of this invention is to provide an improved object position plotter.

Another object of this invention is to provide an improved method and means for plotting and reading out the X and Y coordinate distances from a predetermined reference point to a moving vehicle at any given instant.

Still another object of this invention is to provide a relatively simple position-to-signal synthesizer that is sufficiently accurate to simulate real-life conditions in a training situation.

A further object of this invention is to provide an improved graphic position and tracing indicator that is capable of considerable accuracy, rapid response, and relatively few moving parts.

Another object of this invention is to provide an improved remote position plotting means, the output signals of which may be used to read out the X and Y coordinates of a remotely located moving vehicle or other object or device and/or otherwise control, enable, disable, or appropriately actuate other predetermined compatible utilization apparatus.

Another object of this invention is to provide an object position measuring and indicating method and means that is easily and economically constructed, operated, transported, and maintained.

Other objects, advantages and novel features of the invention will become apparent from the following detailed description of the invention when considered in conjunction with the accompanying drawing wherein:

DESCRIPTION OF THE PREFERRED EMBODIMENT

Figure 1:
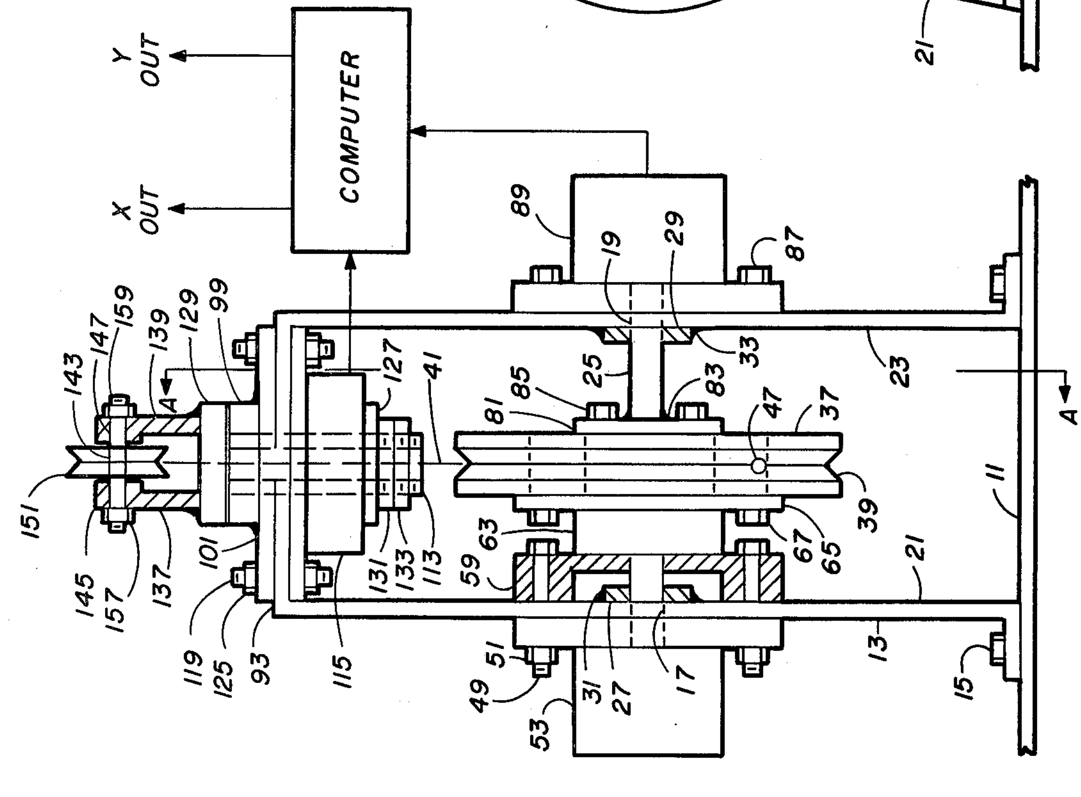
FIG. 1 is a combination rear-end and block diagram view of the remote position plotter constituting the subject invention.
Figure 2:
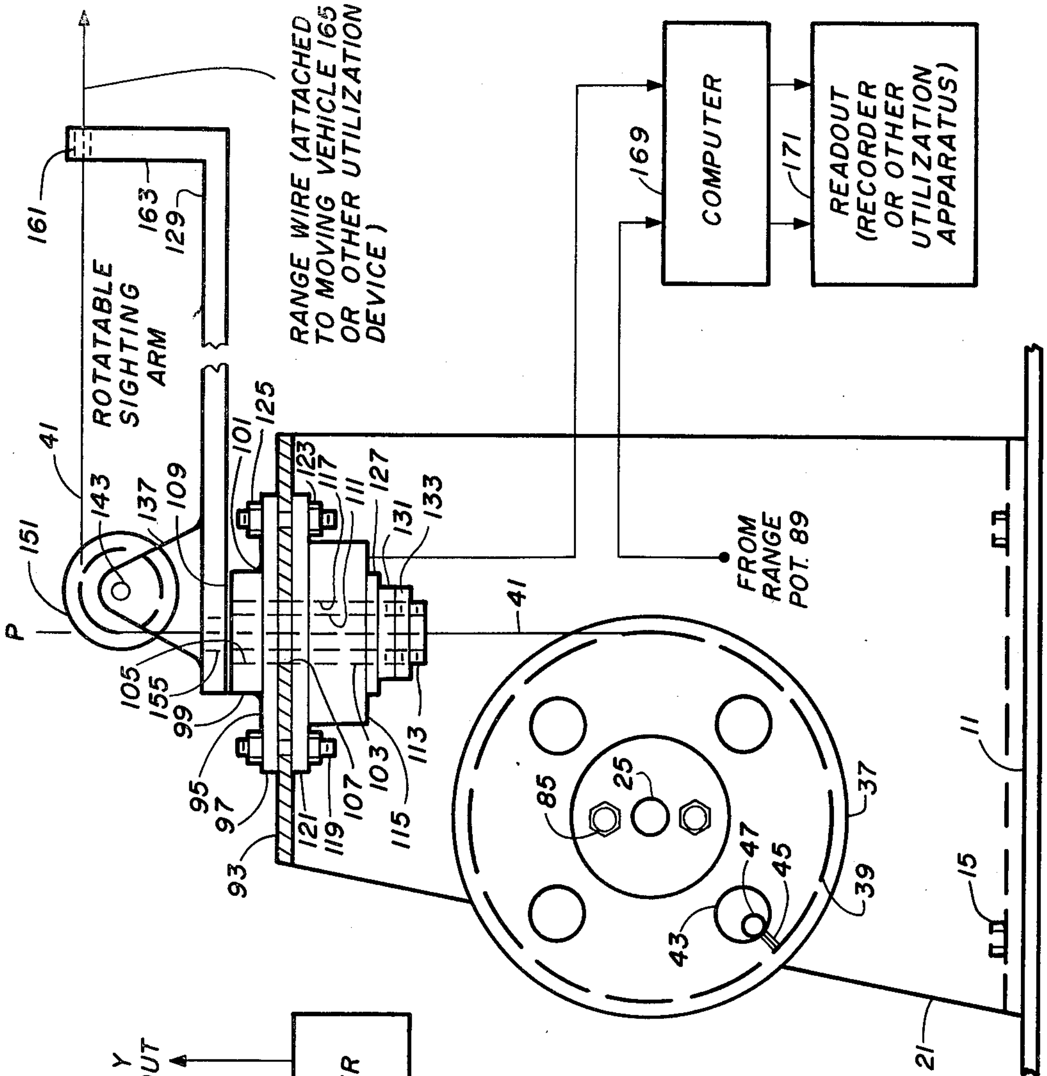
FIG. 2 is a side sectional view of the device of FIG. 1, with the section disclosed having been taken at Section A—A thereof.
Figure 3:
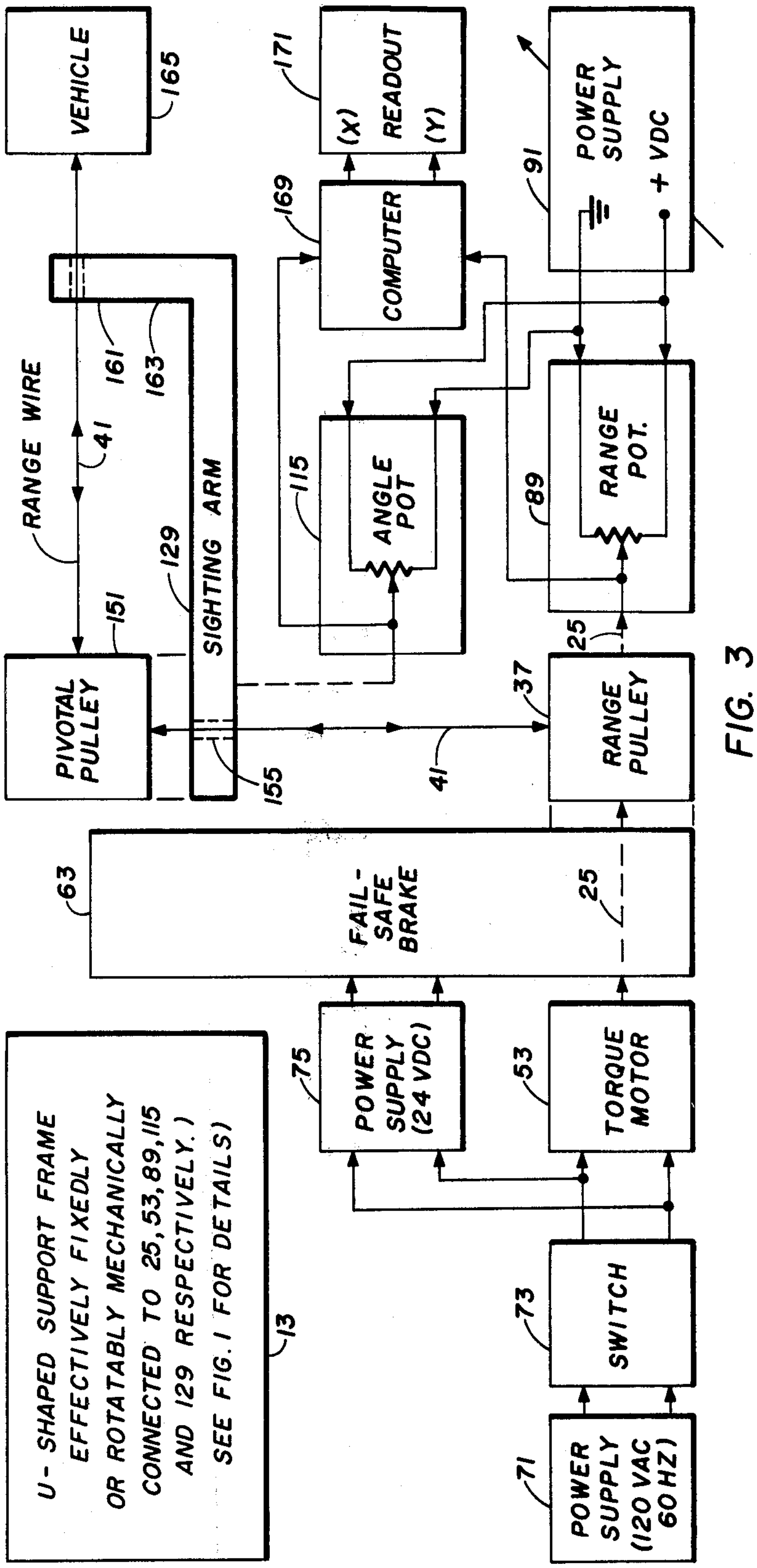
FIG. 3 is a somewhat generalized functional block diagram of the overall system incorporating the instant invention.

Referring now to FIGS. 1, 2, and 3, wherein like parts are referenced by like reference numerals, there is shown a base 11, with a U-frame 13 mounted thereon by any suitable way, such as, for instance, by an appropriate plurality of bolts 15. Mounted through a pair of oppositely disposed holes 17 and 19 in oppositely disposed walls 21 and 23 of said U-frame 13 is a shaft 23, the ends of which are rotatably supported within suitable bearings 27 and 29—that is plain, roller, or ball—respectively. Of course, said bearings may be attached to their respective U-frame walls 21 and 23 by means of welds 31 and 33, or any other suitable conventional means. Fixedly mounted on said shaft is a range pulley 37 having a groove 39 disposed therein about the circumference thereof, on which a range wire 41 is wrapped. Range pulley 37 has a plurality of holes 43 extending therethrough. One thereof contains a slot 45 through which one end of said range wire 41 extends and is releasably secured thereto by means of a knot or peg 47 or some other conventional restraining means. Although not shown in such detail, range wire 41 may be wound around the periphery of groove 39 of range pulley 37 to whatever extent is warranted by operational circumstances and the accuracy desired. Moreover, for such purpose, said groove 39 may include whatever flat, screw, V, or other configured surface as will accommodate wire 41 in an optimum manner. Obviously, it would be well within the purview of the artisan having the benefit of the teachings presented herewith to select that type of groove surface which will provide the best range characteristics during any given operational circumstances.

Mounted on the outside of wall 21, as by a plurality of bolts 49 and nuts 51 is a torque motor 53 which is also connected in such manner to one end of shaft 25 as to be timely driven thereby while placing a restraining force thereon, as is conventional with torque motors, thereby causing a constant tension on wire 41 to occur. Although any appropriate, conventional or other torque motor may be used as torque motor 53, it has been found that the Bodine torque motor, type 23, manufactured by the Bodine Electric Co. of Chicago, Illinois, works quite satisfactorily for such purpose.

On the inside of wall 21, by means of a mounting cup 59 and the aforesaid plurality of bolts 49, there is mounted an electric, normally on, fail-safe brake 63, the latter of which brakes range pulley 37 (and shaft 25 connected thereto) when de-energized, because it is attached to said pulley by means of flange 65 and plurality of bolts 67, as will as discussed more fully below, because brake 63 provides one of the key improvement in the invention.

Timely energization of the aforesaid torque motor 53 is effected by any conventional 120 volt alternating current (VAC) voltage power supply 71 and the manual or other closing of a normally open switch 73 connected therebetween, as is best seen in FIG. 3. Because the outputs of said switch 73 are also connected via a 24 volt direct current voltage (VDC) power supply 75 to the control inputs of fail-safe brake 63, brake 63 is released upon the energization thereof, with such situation occurring whenever said switch 73 is closed.

As previously suggested, shaft 25 extends through range pulley 37 and is connected thereto. For such connection purpose, a flange 81 (welded to shaft 25 by suitable welds 83) is attached to pulley 37 by means of a plurality of bolts 85. Connected to the outside of walls 23 by means of a plurality of bolts 87 is a range potentiometer 89, the movable arm of which is connected to the other end of shaft 25, and the resistance of which is fixed with respect to said wall 23 and connected to a positive direct current voltage power supply 91.

Another key sub-assembly to be discussed now causes the instant invention to work smoothly and with improved accuracy. Although actually very simple, it prevents the entanglement and binding of wire 41, while still permitting it to be direct acting, as far as its associated components and the vehicle whose position is being measured and plotted are connected. As a matter of fact, it facilitates the optimumly combining of both linear and angular forces and the elements respectively carrying them in such manner that they may be accurately sensed or picked-off without the occurrence of interference or effective drag therebetween. Upon top wall 93 of U-frame 13 is mounted a bearing support 95 having a flanged portion 97 and a boss 99, either integrally connected to said flange portion 97 or as by weld 101. A bearing shaft 103 extends downwardly through a hole 105 in bearing support 95 and another hole 107 in alignment with hole 105 in wall 93. The top of boss 99 constitutes a flat bearing 109. Shaft 103 also has a hole 111 extending clear through along the longitudinal axis thereof, with the inside diameter thereof such that the aforesaid range wire 41 may pass therethrough without any friction with the inside diameter wall of shaft 103. The outside lower extremity of shaft 103 contains threads 113.

An angle potentiometer 115 having a vertical center hole 117 therethrough is mounted around shaft 103 on the underside of wall 93 as by means of a plurality of end threaded studs 119 extending through a flanged portion 121, wall 93, and the aforesaid flange 97, all of which are held together by pluralities of nuts 123 and 125 screwed on the opposite ends of studs 119, respectively.

Although any appropriate potentiometer may be employed as angle potentiometer 115, it has been found the Spectrol Precision Potentiometer model 408, manufactured by the Spectrol Electronic Corporation of City of Industry, California, may be used therefor.

Depending on the type of potentiometer selected by the artisan as angle potentiometer 115, a lock ring 127 may be connected between shaft 103 and the movable arm of said potentiometer 115—as by conventional locking pins, keys and slots, or the equivalent (not shown)—so as to cause shaft 103 and the movable arm of potentiometer 115 to rotate together.

A movable "sighting", L-shaped arm 129 is rigidly connected to the top of hollow shaft 103 in any conventional manner, and a pair of nuts 131 and 133 are screwed on the threads 113 of shaft 103 in such manner as to have sufficient end play to allow shaft 103 to turn freely within holes 105, 107, and 117, while still holding the assembly of arm 129, shaft 103, lock ring 127, together in a proper operable manner. Of course, as best seen in FIG. 2, movable arm 129 rotates about axis P which coincides with the vertical portion of range wire 41; hence, movable arm 129 effectively moves within a plane that is substantially normal to the vertical portion of range wire 41. Naturally, if the attitude of the invention is something other than level or horizontal, wire 41 and movable arm 129 would have other attitudes, too. In any event, the fixed resistance portion of angle potentiometer 115 is electrically connected to the aforesaid positive direct current voltage power supply 91.

A pair of brackets 137 and 139 are fixedly connected to the top of movable arm 129. An end threaded studlike shaft 143 is mounted in diametrically disposed holes 145 and 147 located therein, respectively, and a pivotal pulley 151 is rotatably mounted on shaft 143 between said brackets 137 and 139. Of course, as may readily be seen, range wire 41 passes through a wire hole 155 in movable arm 129 and then over pivotal pulley 151, thereby facilitating the changing of the direction thereof and the tensile forces caused thereby. A pair of nuts 157 and 159 are respectively screwed on the ends of threaded shaft 143 to hold it firmly in place in brackets 137 and 139.

Range wire 41 is passed through a slip-fit hole 161 in an angled portion 163 of movable arm 129, and the end thereof that is opposite that wrapped around range pulley 37 is connected to any utilization apparatus whose position coordinates are being measured, such as, for instance, a moving vehicle 165.

Figure 4:
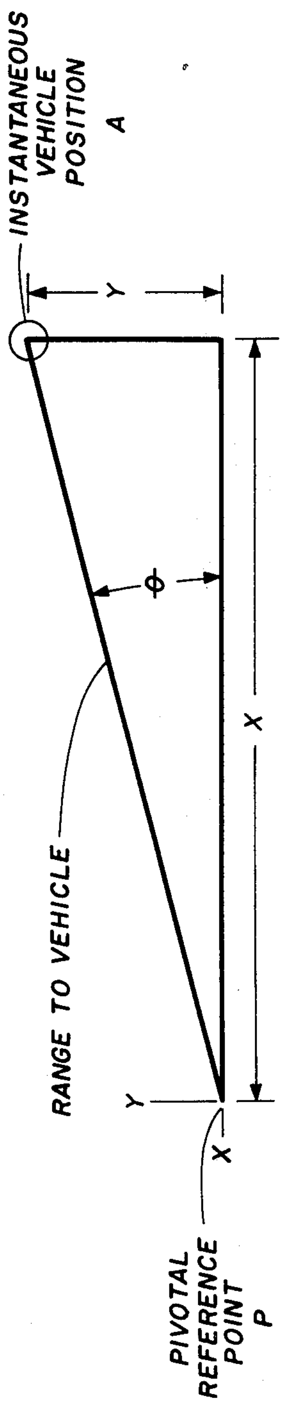
FIG. 4 graphically illustrates a typical operational procedure that is employed in using the invention, so as to determine the X and Y coordinates of the device whose position is being measured.

The electrical outputs of range and angle potentiometers 89 and 115 are connected to the inputs of a computer 169. Because range and angle potentiometers 89 and 115 provide analog signals representing range and angle of vehicle 165 with respect to the subject invention (which acts as a reference point), said computer 169 should be designed to compute the X and Y coordinates thereof in accordance with the following equations:

$$X = R/\cos\theta \quad (1)$$

and $$Y = R/\sin\theta, \quad (2)$$

where R is the distance from the subject measuring instrument, and X and Y are the coordinate distances thereto, as schematically portrayed in FIG. 4. Ostensively, there are many computers that are commercially available which will perform the aforementioned mathematical functions; however, it has been found that model REAC 550 built by Dynamics Corporation of America of Boynton Beach, Florida, works quite well thereas.

The X and Y outputs of computer 169 are or may be connected to any suitable readout 171 or to any other utilization apparatus, for that matter. Of course, said readout 171 may be an indicator, recorder, or whatever, depending on the operable circumstances involved; and, thus, the selection thereof would merely involve the design choice of the artisan.

At this time, it would perhaps be noteworthy that all of the elements and components depicted in schematic and/or block diagram form are well known and commercially available. Accordingly, it should be understood that it is their unique interconnections and interactions the effect the instant invention and make it produce the new and improved results mentioned above.

MODE OF OPERATION

The operation of the invention will now be discussed briefly in conjunction with all of the figures of the drawing.

Although relatively simple of structure and operation, the present invention performs an exceedingly valuable service, especially when it comes to ascertaining and keeping track of the position of a moving vehicle (or other object) with respect to a known reference point. And even more importantly, it permits so doing, even though said moving vehicle is a very short distance away or a very long distance away.

Referring now to FIG. 4, if it is assumed that reference point P (also shown in FIG. 2) is known and vehicle 165 is located at the instantaneous vehicle position A as shown, then the imaginary coordinate axes X and Y may be portrayed as an abscissa and ordinate, respectively; and in such case, X would represent the X coordinate distance to A and Y would represent the Y coordinate distance to A with respect to the aforesaid ordinate and abscissa, respectively. Accordingly, as is well known mathematics, when such X and Y values and reference point P are known, the position of A with respect to P is known. Of course, as again is well known in mathematics, if position P is known and a base line is drawn therethrough, and the range (R) and angle θ—as shown in FIG. 4—are also known, then X and Y coordinate distances to A may be readily calculated by a computer performing in accordance with the aforementioned equations (1) and (2), respectively.

With the device of FIGS. 1 and 2 located at known reference point P, and with moving vehicle 165 connected to the end of range wire 41 that extends through hole 161 in angled portion 163 of movable arm 129, as said vehicle 165 moves about its course, wire 41 is paid out or taken up, as the case may be, as the distance between vehicle 165 and the pivot point P of movable arm 129—that is, the distance between behicle 165 and the vehicle portion of range wire 41—changes. Of course, during such situation, range wire 41 is maintained in a fairly taut condition by torque motor 53 acting on range pulley 37, around which one end of range wire 41 is wound. Accordingly, for all practical purposes, the rotational position of range pulley 37 is proportional to the range of vehicle 165 because wire 41 is constantly in a straight line condition therebetween.

Because of the constant tension effectively applied to range wire 41 by torque motor 53 and range pulley 37, and because movable arm 129 is free to easily rotate about its pivot point P, movable arm 129 acquires whatever angle θ that said taut wire 41 has acquired, since arm 129 would be moved to such angle thereby, as a result of the predetermined tension thereon. Obviously if vehicle 165 is moving, range R and angle θ would be constantly changing; however, if for the purpose of making this disclosure as simple as possible it is considered that instantaneously vehicle 165 is stopped, at that particular instant the R and θ values would be measured, and analog voltage signals would be generated that are respectively proportional thereto. Such analog R and θ voltages are produced because range pulley 37 is connected to the movable arm of range potentiometer 89 and movable arm 129 is connected to the movable arm of angle potentiometer 115.

Although for sake of drawing convenience both of the resistances of ranges potentiometer 89 and angle potentiometer 115 are illustrated as being straight in FIG. 3, they are, in fact, substantially circular and conform to rotational movements of the output shaft 25 of range pulley 37 and the shaft 103-lock 127 combination effectively interconnecting said movable arm 129 and angle potentiometer 115.

The aforesaid range (R) and angle (θ) signals are, as previously mentioned, supplied to computer 169, which, in turn, calculates the X and Y coordinate value equivalents therefrom and produces a pair of analog signal voltages proportional thereto, respectively. Those X and Y signal voltages are then supplied to readout 171 which indicates, records, or otherwise reads them out in terms intelligible to human beings. Of course, the outputs of computer 169 may be used to operate or control any other suitable utilization apparatus, too, if so desired, inasmuch as so doing would not violate the spirit or scope of the invention.

From the foregoing, it may be seen that the subject invention constitutes a new and unobvious combination of elements that effect an improvement over the aforementioned prior art and, of course, over all other known prior art as well, as far as the inventor is concerned.

Obviously, many modifications and variations of the present invention are possible in light of the above teachings. It is, therefore, to be understood that within the scope of the appended claims the invention may be practiced otherwise than as specifically described.

What is claimed is:

1. A remote position plotter system for measuring the X and Y coordinates of a moving vehicle with respect to a known reference point P effected by the intersection of predetermined X and Y coordinate axes, said remote position plotter system comprising in combination:

an alternating current voltage power supply;

a switch electrically connected to the output of said alternating current voltage power supply;

a first direct current voltage power supply electrically connected to the output of said switch;

a U-shaped frame having a pair of substantially parallel walls, each of which has an aligned hole therethrough, respectively, and an interconnecting wall, with a first bearing hole therethrough;

a first shaft rotatably mounted within and extending through the aforesaid pair of aligned holes in said U-shaped frame;

a torque motor mounted on one of the walls of said U-shaped frame, mechanically connected to one end of said first shaft, and electrically connected to the output of said switch;

a pair of bearings respectively mounted on the pair of parallel walls of said U-shaped frame in alignment with the pair of aligned holes located therein for rotatably supporting the aforesaid first shaft;

a range pulley effectively mechanically connected to said first shaft for rotation therewith;

means mounted on said one wall of the aforesaid U-shaped frame, electrically connected to the output of said first direct current voltage power supply and effectively, releasably, mechanically connected to said range pulley for the braking thereof whenever said switch is open and for the release thereof whenever said switch is closed;

a flat surface bearing means having a second bearing hole therethrough mounted on the interconnecting wall of said U-shaped frame, with the second bearing hole thereof disposed in alignment with the first bearing hole in said interconnecting wall;

a second shaft rotatably extending through said first and second bearing holes, said second shaft having a wire hole extending therethrough along the longitudinal axis thereof;

a sighting arm mounted in bearing engagement with the aforesaid flat surface bearing means and mechanically connected to one end of said second shaft for rotation therewith, said sighting arm having an extension portion with a wire hole extending therethrough near one end thereof that is in alignment with the wire hole through said second shaft and an angled portion connected to the other end thereof with another wire hole located therethrough;

a range potentiometer, having a fixed resistance and a rotatable slide in electrical contact therewith, mounted on the other wall of said U-shaped frame, with the rotatable slide thereof effectively connected to the other end of said first shaft for rotation therewith;

an angle potentiometer, having a fixed resistance and a rotatable slide in electrical contact therewith, mounted on the interconnecting wall of said U-shaped frame, with the rotatable slide thereof effectively connected to the other end of said second shaft for rotation therewith;

a pivotal pulley mounted adjacent the end of said sighting arm that is connected to the aforesaid second shaft, with one edge thereof in substantial alignment with an imaginary extension of the longitudinal axis of said second shaft; and a flexible range wire connected to and wrapped at least partially around said range pulley at one end thereof, with the remainder of said flexible range wire threaded through the wire hole of said second shaft and the wire hole of the extension portion of said rotatable sighting arm that is adjacent thereto, partially wrapped around said pivotal pulley, and threaded through the wire hole of the angled portion of said rotatable sighting arm, and with the other end thereof adapted for being connected to a predetermined vehicle.

2. The invention of claim 1, wherein said alternating current voltage power supply comprises a 120 volt, 60 Hz power supply.

3. The invention of claim 1, wherein said first direct current voltage power supply electrically connected to the output of said switch comprises a 24 volt direct current voltage power supply.

4. The invention of claim 1, further characterized by a predetermined positive direct current voltage power supply connected across the fixed resistances of said range and angle potentiometers.

5. The invention of claim 1, further characterized by a movable vehicle connected to the other end of said range wire in such manner as to apply a predetermined tension thereto.

6. The invention of claim 1, further characterized by a computer electrically connected to the rotatable slides of said range and angle potentiometers for computing the X and Y coordinates of any predetermined vehicle connected to the other end of the aforesaid range wire in response to the electrical voltages picked off therefrom.

7. The invention of claim 6, further characterized by a readout connected to the outputs of said computer.

8. A vehicle position plotter, comprising in combination:

a U-shaped frame means having a pair of diametrically opposed parallel walls and a connecting wall therebetween at one of the ends thereof;

a pair of apertures respectively disposed in diametrically opposed alignment in and through the pair of diametrically opposed walls of said U-shaped frame;

a shaft rotatably extending through said pair of apertures;

a range pulley effectively connected to said shaft for rotation therewith;

a positive direct current voltage source having first and second outputs;

means effectively connected to one end of said shaft, and having first and second inputs respectively connected to the first and second outputs of said positive direct current voltage source and an output for producing a first analog signal repesenting the range of a vehicle whose position is being plotted with respect to a predetermined reference point;

a boss having a flat bearing surface mounted on the connecting wall of said U-frame;

another aperture extending through said boss and the aforesaid connecting wall in a direction that is normal thereto and in substantial spatial alignment with one edge of the aforesaid range pulley;

a hollow shaft rotatably mounted in said another aperture;

an L-shaped moving arm having a sight hole through the angle end portion thereof connected to the end of said hollow shaft that is opposite side range pulley;

still another aperture disposed in and through said moving arm in such manner that it is in alignment with the aforesaid another aperture extending through said boss and connecting wall;

a pivotal pulley effectively mounted on said movable arm for rotation therewith, and with a peripheral edge thereof disposed in pivotal alignment with all of the aforesaid apertures;

a predetermined range wire connected to and at least partially wrapped around the periphery of said range pulley, and passing through the hollow of the aforesaid hollow shaft, said still another aperture disposed in and through said moving arm, and the sight hole in the angle end portion of said moving arm, with the end thereof opposite that connected to said range pulley adapted for being connected to the vehicle whose coordinate distances are being obtained;

means effectively connected to said hollow shaft for rotation therewith, and having first and second inputs respectively connected to the first and second outputs of said positive direct current voltage source and an output for producing a second analog signal representing the angle between a line of sight between said predetermined reference point and the vehicle whose position is being measured with respect to a pair of predetermined intersected perpendicular reference axes that extend through said predetermined reference point at their point of intersection; and means having first and second inputs respectively connected to the outputs of said first and second analog signal producing means, an X output, and a Y output for continuously computing the coordinate distances said vehicle is located from said pair of predetermined perpendicular reference axes, respectively, in response to the aforesaid first and second analog signals.

9. The device of claim 8, wherein said means having first and second inputs respectively connected to the outputs of said first and second analog signal producing means for continuously computing the coordinate distances said vehicle is located from said pair of predetermined perpendicular reference axes, respectively, in response to the aforesaid first and second signals comprises a computer which calculates $$X=(R/\cos\theta)$$

and $$Y=R/\sin\theta,$$

where

X = the X coordinate axis distance to said vehicle,

Y = the Y coordinate axis distance to said vehicle,

R = said first signal repesenting range to said vehicle, and

θ = said second signal representing the angle between the X coordinate axis and the line of sight to said vehicle taken from the point of intersection of the aforesaid X and Y coordinate axes.

10. The invention of claim 8, further characterized by a utilization apparatus having an X input connected to the X output of said computing means, and a Y input connected to the Y output of said computing means.

11. The invention of claim 8, further characterized by means effectively connected to said first signal producing means for the braking thereof at a fixed position whenever said first signal producing means is made inactive.

12. The invention of claim 11, wherein said means effectively connected to said first signal producing means for the braking thereof at a fixed position whenever said first signal producing means is made inactive comprises a normally on electric brake that is released only when electrically energized at the same time operation of the aforesaid first signal producing means is effected.

13. The invention of claim 8, further characterized by a readout means having an X input connected to the X output of said computing means and a Y input connected to the Y output of said computing means.

14. The device of claim 13, wherein said readout means comprises a recorder.

15. The invention of claim 8, wherein said first analog signal producing means comprises a range potentiometer having a fixed resistance and a movable arm in slidable contact with said fixed resistance, with the fixed resistance thereof connected between the first and second outputs of said positive direct current voltage source, and with the movable arm thereof effectively connected to one end of said shaft.

16. The invention of claim 8, wherein said second analog signal producing means comprises an angle potentiometer having a fixed resistance and a movable arm in sidable contact therewith, with the fixed resistance thereof connected between the first and second outputs of said positive direct current voltage source, and with the movable arm thereof effectively connected to one end of said hollow shaft for rotation therewith.

17. A vehicle position measuring apparatus comprising in combination:

a U-shaped frame having a pair of parallel walls, each of which has an aligned aperture, and an interconnecting wall with a bearing hole therethrough;

a shaft means rotatably mounted within and extending through the aligned apertures of said pair of parallel walls for wrapping around the periphery thereof a range wire, said range wire effectively connected at one end thereof to said shaft means and at the opposite end thereof to a moving vehicle;

means effectively connected to one end of said shaft means and having first and second inputs and an output for producing a first analog signal representing the range of said moving vehicle whose position is being plotted with respect to a known reference point;

a voltage power supply having an output;

a switch having an input connected to the output of said voltage power supply and an output;

torque motor means mechanically connected to the other end of said shaft means, and having an input connected to the output of said switch for placing a restraining force on said shaft means and thereby cause a constant tension to occur on said range wire whenever said switch is closed;

means mechanically connected to said shaft means and having an input effectively connected to the output of said switch for the braking of said shaft means whenever said switch is open, and for the releasing of said shaft means whenever said switch is closed;

a bearing shaft rotatably extending through the bearing hole of said U-shaped frame assembly, said bearing shaft having a wire hole extending along the longitudinal axis thereof with said range wire passing through said wire hole;

sighting arm means rigidly connected to one end of said bearing shaft, and having a wire hole near one end thereof that is in alignment with the wire hole of said bearing shaft and a slip-fit hole near the other end thereof for passing said range wire therethrough, and for allowing said range wire to rotate about said known reference point in response to the movement of said moving vehicle;

means effectively connected to the other end of said bearing shaft for rotation therewith, and having first and second inputs and an output for producing a second analog signal representing the angle between a line of sight between said known reference point and said moving vehicle whose position is being measured with respect to a pair of predetermined intersected perpendicular reference axes that extend through said predetermined reference point at their point of intersection; and means having first and second inputs respectively connected to the outputs of said first and second analog signal producing means for continuously computing the coordinate distances said vehicle is located from said pair of predetermined perpendicular reference axes, respectively, in response to the aforesaid first and second analog signals.

18. The apparatus of claim 17, further characterized by a direct current voltage source having first and second outputs respectively connected to the first and second inputs of said first and second analog signal producing means.

19. The apparatus of claim 17, wherein said shaft means comprises:

a shaft rotatably extending through the aligned apertures of said pair of parallel walls; and a range pulley effectively connected to said shaft for rotation therewith.

20. The apparatus of claim 17, wherein said first analog signal producing means comprises a range potentiometer having a fixed resistance and a movable arm in slidable contact with said fixed resistance, with the movable arm thereof effectively connected to one end of said shaft means.

21. The apparatus of claim 17, wherein said sighting arm means comprises:

an L-shaped sighting arm mechanically connected to one end of said bearing shaft and having a wire hole near one end thereof that is in alignment with the wire hole of said bearing shaft, and a slip-fit hole through the angle end portion thereof; and a pivotal pulley mounted adjacent to the end of said L-shaped sighting arm that is connected to said bearing shaft, with one edge thereof in substantial alignment with an imaginary extension of the longitudinal axis of said bearing shaft.

22. The apparatus of claim 17, wherein said second analog signal producing means comprises an angle potentiometer having a fixed resistance and a movable arm in slidable contact therewith, with the movable arm thereof effectively connected to the other end of said bearing shaft.

23. The apparatus of claim 17, wherein said means having first and second inputs respectively connected to the outputs of said first and second analog signal producing means for continuously computing the coordinate distances said vehicle is located from said pair of predetermined perpendicular reference axes, respectively, in response to the aforesaid first and second signals comprises a computer which calculates $$X=(R/\cos\theta)$$

and $$Y=(R/\sin\theta)$$

where

X = the X coordinate axis distance to said vehicle,

Y = the Y coordinate axis distance to said vehicle,

R = said first signal representing range to said vehicle, and $\theta$ = said second signal representing the angle between the X coordinate axis and the line of sight to said vehicle taken from the point of intersection of the aforesaid X and Y coordinate axes.

* * * * *